United States Patent [19]

Jekat et al.

[11] Patent Number: 4,687,547

[45] Date of Patent: Aug. 18, 1987

[54] PROCESS FOR THE SEPARATION OF MATERIALS OBTAINED BY MEANS OF HIGH PRESSURE EXTRACTION

[75] Inventors: Herbert Jekat, Schopfheim; Erwin Schütz, Palling; Kurt Stork, Vohburg, all of Fed. Rep. of Germany

[73] Assignee: SKW Trostberg Aktiengesellschaft, Trostberg, Fed. Rep. of Germany

[21] Appl. No.: 715,090

[22] Filed: Mar. 22, 1985

[30] Foreign Application Priority Data

Apr. 17, 1984 [DE] Fed. Rep. of Germany ....... 3414562

[51] Int. Cl.$^4$ .......................... B01D 1/12; B01D 1/22
[52] U.S. Cl. .......................................... 159/3; 159/44; 159/48.1; 159/48.2; 159/DIG. 2; 202/197; 202/236; 202/200; 203/1; 203/40; 203/90; 203/98
[58] Field of Search .................. 159/3, 48.1, 44, 48.2, 159/47.1, DIG. 2; 203/49, 90, 50, 98, 1, 2, 40; 202/197, 236, 160, 200; 426/600

[56] References Cited

U.S. PATENT DOCUMENTS

| | | | |
|---|---|---|---|
| 2,889,874 | 6/1959 | Gauvin | 159/3 |
| 3,352,693 | 11/1967 | Bark | 159/3 |
| 3,622,466 | 11/1971 | West | 159/3 |
| 3,860,492 | 1/1975 | Lowi, Jr. et al. | 203/49 |
| 3,969,196 | 7/1976 | Zosel | 203/49 |
| 4,217,176 | 8/1980 | Antony | 159/3 |
| 4,218,491 | 8/1980 | Laws et al. | 426/600 |
| 4,273,670 | 6/1981 | Cheng et al. | 159/44 |
| 4,394,221 | 7/1983 | Stage et al. | 159/49 |

FOREIGN PATENT DOCUMENTS

| | | | |
|---|---|---|---|
| 2352758 | 10/1973 | Fed. Rep. of Germany | 159/18 |
| 1381770 | 1/1964 | France | 159/DIG. 30 |
| 2145343 | 3/1985 | United Kingdom | 203/21 |

OTHER PUBLICATIONS

Sharpe, F. R. et al., "Preparation of Hop Extracts Rich in Particular Constituents", *J. Inst. Brew.*, vol. 86, Sep.–Oct. 1980, pp. 234–241.

Primary Examiner—S. Leon Bashore
Assistant Examiner—V. Manoharan
Attorney, Agent, or Firm—Felfe & Lynch

[57] ABSTRACT

The present invention provides a process for the separation of materials obtained by means of high pressure extraction from an extraction agent, wherein extraction agent loaded with extracted material is passed from below into a separator comprising a head (2), a bottom (3), a runback pipe (4) and a heat exchanger (1) in the form of one or more pipes and extract recycled in a forced circulation via the head (2) and the runback pipe (4) to the bottom (3) and there either discharged and/or returned to the heat exchanger (1), the extraction agent evaporated in the heat exchanger being removed via a filter (11) on the head (2).

5 Claims, 1 Drawing Figure

U.S. Patent  Aug. 18, 1987  4,687,547
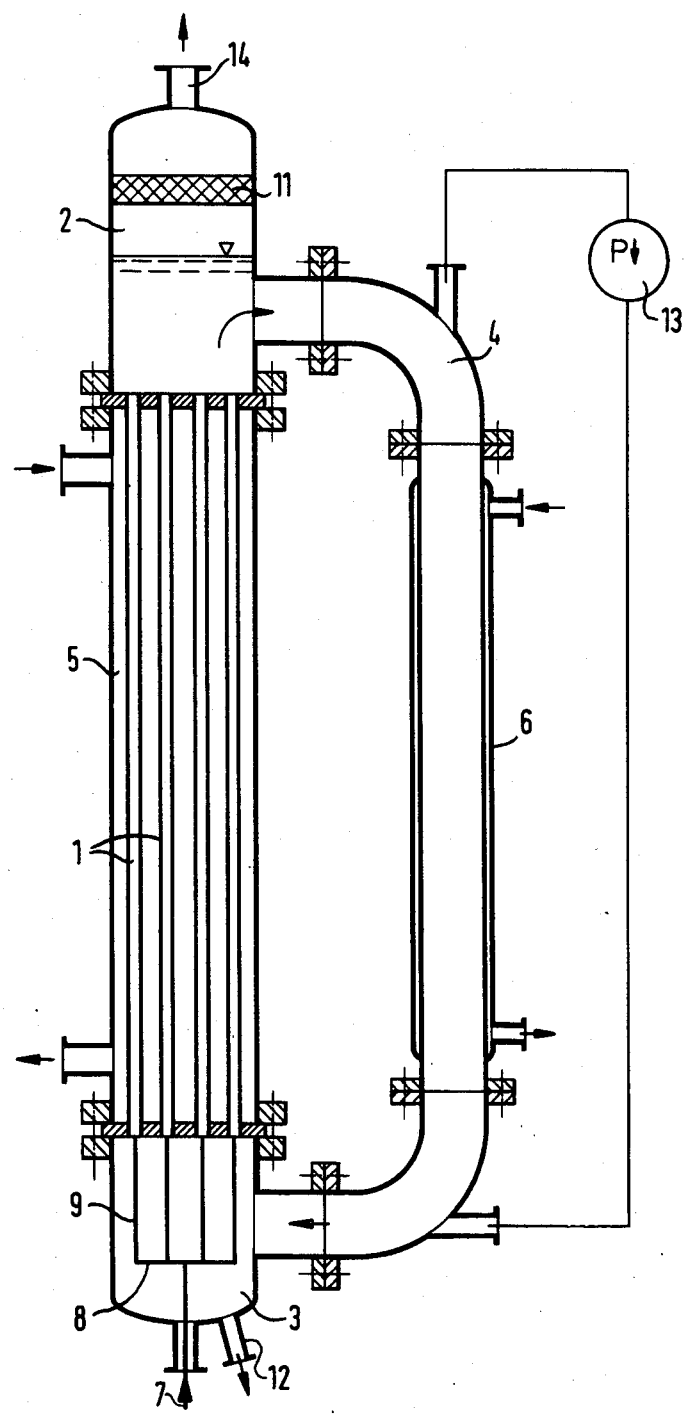

PROCESS FOR THE SEPARATION OF MATERIALS OBTAINED BY MEANS OF HIGH PRESSURE EXTRACTION

The present invention is concerned with a process for separating a material obtained by a high pressure extraction process from the extraction agent used to obtain the material in the high pressure extraction process.

High pressure extraction, which is a new extraction process for obtaining and separating a soluble material from a mixture of materials of vegetable, animal and mineral origin, takes place in two steps. In the first step, the gas extraction agent, for example carbon dioxide, is compressed a to a pressure which can be-in the sub- or super-critical region with for extracting the material as the extract from the mixture. This is followed by separating the extract from the extraction agent, the solubility of the extract in the extraction agent being reduced for this in one of three different ways:

(a) In the case of extraction in the supercritical pressure range, the extraction agent is decompressed to a subcritical pressure and subsequently completely evaporated, the extract thereby being obtained without residues.

(b) If extraction is carried out in the subcritical pressure range, then evaporation and possibly overheating of the extraction agent can take place without a decompression step.

(c) If it is desired to carry out the separation of the extract in the supercritical pressure range of the extraction agent, a temperature change is necessary but the separation then does not take place completely.

The common feature of all of the separation procedures is the introduction or removal of heat, the amount of which depends upon the process conditions, especially the turnover of extraction agent. The higher the extraction agent turnover, the more the amount of heat required for the separation per unit time. Since the materials to be extracted are very often natural materials, the thermal stability of which is limited, for the evaporation of the extraction agent it is not possible to use highly heated heat carriers, for example superheated steam. Instead, it is necessary to use heat carriers with a relatively low temperature. Corresponding to the small temperature differences between the heat carrier and miscelle, heating and cooling elements with large surface areas must be used. This means a large expense for apparatus and, in addition, very severely limits the cleaning of the separation device. However, the requirements for cleaning the separator are very high, especially when different products for foodstuff use are to be extracted in the same apparatus.

Hitherto, various constructions and processes have been described for the separation of such extracted materials which, however, do not optimally satisfy the technical requirements.

Thus, for example, Federal Republic of Germany Patent Specification No. 28 01 843 discloses a separation in a pressure container which is heated via an internal heating coil. The disadvantages of this process are that the cleaning of the heating coil gives rise to problems and that the heating coils are made pressure-resistant and must be arranged in a pressure container, which requires high investment costs.

According to Federal Republic of Germany Patent Specification No. 14 93 190, the separation is carried out in a pressure container with preceding heat exchanger. In this case, it can very easily result in stoppages in the heat exchanger and the problem of cleaning is also not solved in the case of this process.

Finally, from J. Inst. Brew., 234/1980, a separator is known which is operated as an externally heated pressure container. However, because of the small heating surface, this separator does not enable, on a technical scale, a sufficient heat transmission for the evaporation of the extraction agent.

Therefore, the problem with which the present invention is concerned is to provide a process for the separation of a material obtained as an extract by means of high pressure extraction from the extraction agent therefor, the process not displaying the above disadvantages not requiring a large expense for apparatus, and permitting the introduction and removal of the large amounts of heat necessary for high extraction agent turnover.

Thus, according to the present invention, there is provided a process for the separation of a material obtained by means of high pressure extraction from an extraction agent thereof, wherein extraction agent loaded with extracted materials is passed from below into a separator comprising a head, a bottom, a runback pipe and a heat exchanger in the form of one or more pipes and extract recycled in a force circulation via the head and the runback pipe to the bottom and there either discharged and/or returned to the heat exchanger, the extraction agent evaporated in the heat exchanger being removed via a filter on the head.

Surprisingly, we have found that with the help of the process according to the present invention, very high heat transfer can be achieved so that it is possible to work with comparatively low temperature gradients between the heat carrier and the loaded extraction agent or with relatively small heat transfer surfaces therebetween. Thus, in the case of the process according to the present invention, for a definite extraction agent turnover, very much smaller heat transfer surfaces are necessary than in the case of the previously known separation processes. Furthermore, with the process according to the present invention, the nozzles surprisingly do not become blocked even when highly viscous materials are separated.

The process according to the present invention can be operated not only continuously but also discontinuously.

In the case of a preferred embodiment of the process according to the present invention, the state of filling of the runback pipe can be controlled via measurements of the state of filling. For this purpose, there can be used the conventional methods of measurement, for example floats or pressure difference measurements.

The process according to the present invention can be used for the separation of liquid, highly viscous and also solid extracts. When extracts in the form of solid materials are to be separated, it is preferred to heat the solid material, in the case of the separation, up to its liquefaction point. However, it is also possible, for example, to operate two separators according to the present invention alternatingly in such a manner that, in each case, one apparatus is taken out of the extraction circulation and the extract is heated until it liquefies and can then be removed.

If the extract is thermally labile, there is another possibility for the separation of the solid material. A solvent is then placed in the separator which takes up the extract and makes possible its removal in liquid form. This embodiment is especially useful for the quantitative separation of very small amounts of extract. The separator is then filled up to a definite state of filling with a liquid adjuvant phase. For this purpose, there is used a solvent which can either dissolve, suspend or emulsify the extracted material. The liquid phase is then removed after the extract has been enriched up to the desired concentration. This process can also be carried out continuously. In this case, the amounts of adjuvant phase introduced and removed must be equal. As adjuvant phases, there are especially preferably used those liquids which possess an appropriate take-up ability for the extract. Such liquids include, for example, water, inorganic solvents, organic solvents and mixtures thereof. Liquefied gases can also be used.

For the separation of the extract, a reduction of pressure can be necessary. This is carried out immediately before the entry into the heat exchanger by appropriate throttle means, either in the nozzle system alone or by means of an additional valve.

In order to obtain substantially dry extracts, the separation temperature can be increased up to 40° C. above the evaporation temperature of the extraction agent at the pressure prevailing in the separator. In this way, water contained in the mixture passes over with the extraction agent.

The present invention also provides a device for the separation of materials obtained by means of high pressure extraction from the extraction agent, said device having a separator, comprising a head, a bottom, a runback pipe and a heat exchanger in the form of one or more pipes, a distributor system with nozzles being present on the bottom, via which a mixture, consisting of extraction agent and extracted material, can be sprayed into the heat exchanger, the head being provided with a pipe having a filter via which evaporated extraction agent can be led off.

A preferred embodiment of a separator device according to the invention is illustrated in elevation, partly in section, in the FIGURE of the accompanying drawing. A heat exchange pipe, bundle 1 and a runback pipe 4 parallel connect a head 2 to a bottom 3. These are constructed according to the pressures to be used for the separation. A mantle 5 surrounds a substantial portion of the pipe bundle 1 and a heating mantle 6 surrounds a substantial portion of the runback pipe 4 for circulating a heat carrier respectively thereabout and, therefore, constructed according to the pressure of the heat carrier. The extract loaded extraction agent 7 enters the bottom 3 and is distributed by a distributor system 8 to a nozzle system 9 for spraying via a nozzle system 9 into the individual pipes of the heat-exchanger pipe bundle 1. Round or flat nozzles of appropriate dimensions have proved to be especially advantageous for the nozzle system. In the heat-exchanger pipe bundle 1, there takes place the actual separation extracted material and of the extraction agent. These then reach the head 2 and the extracted material is removed from the head 2 of the separator laterally via the runback pipe 4 which can be heated via a heating mantle 6 as required. The extract is passed to the bottom 3 via the runback pipe 4 where some of it is can either be removed from the separator via a connected pipe 12 and some of it is returned to the heat-exchanger pipe bundle 1 via the distributor and nozzle systems as described above. The returning can be achieved, for example, with the help of a pump 13 connected in parallel with the runback pipe 4. The extraction agent evaporated in the heat-exchanger pipe bundle 1 is removed from the head through a filter 11 therein and a head pipe 14 connected thereto.

The removal of the extract from the bottom via pipe 12 takes place continuously via an appropriate, manually-regulatable throttle (not shown) therein. The state of filling of the separator can be controlled especially advantageously via a measurement of the state of filling 13 in the runback pipe 4. The usual methods of measurement, such as floats or pressure difference measurements, can be used for this purpose.

The heat carrier in the mantle 5 for heating the heat-exchanger pipe bundle 1 can be conventional, for example water or other liquid, vapour or gaseous media.

The separator according to the present invention possesses not only the advantage, in spite of relatively small heating surface, of optimum extraction-agent turnover because of its high heat transmission, but also the advantage of cleaning extraordinarily easily because of its simple construction which permits the head of the separator and possibly also the bottom of the separator to be easily removed in order thus to simplify cleaning.

The following Example is given for the purpose of illustrating the present invention:

EXAMPLE

A hop extract produced with supercritical carbon dioxide is separated in an extract separator according to the process of the present invention at a pressure of 61 bar. The separator consists of a 9.4 m. high heat exchanger pipe which is heated with water at 65° C. at a rate of 400 liters per hour, a separation pot with filter applied to the head and an unheated extract runback pipe. The separator is heat-insulated. After an adjustment time, after which the extract state of filling is determined by pressure difference measurement to be 40%, the measured temperature of the miscella in the region of the spraying in at the lower end of the heat exchange pipe is 25° C., the temperature at the head of the heat exchanger is 51° C. and the temperature in the extract runback is 49° C.

We claim:

1. Process for the separation of a material from a high-pressure extraction agent comprising:
    passing a high-pressure extraction agent in which is dissolved material to be separated therefrom, into a bottom of a separator and from the bottom into a heat exchanger comprising a pipe connected to a head of said separator for receiving said material to be separated and said extraction agent, from said heat exchanger;
    evaporating the extraction agent in the heat exchanger and removing it via a filter in the head; and
    recycling said material from the heat exchanger in a forced circulation from the head to the bottom in a runback pipe therebetween for discharge from the bottom or return to the heat exchanger.

2. Process according to claim 1, wherein the process is carried out continuously.

3. Process according to claim 1, wherein recycling the material in the runback pipe comprises filling the runback pipe with the material and further comprising measuring the filling of the runback pipe for controlling the same.

4. Process according to claim 1, wherein passing the extraction agent with the material from the bottom into the heat exchanger comprises spraying the same therefrom into the heat exchanger through at least one nozzle.

5. Process according to claim 1, wherein the material is solid, and further comprising heating the same to its liquefaction point in the heat exchanger.

* * * * *